(12) United States Patent
Aliwi et al.

(10) Patent No.: US 12,287,040 B2
(45) Date of Patent: Apr. 29, 2025

(54) SPECTACLE BLIND SWINGING DEVICES AND RELATED METHODS

(71) Applicant: SAUDI ARABIAN OIL COMPANY, Dhahran (SA)

(72) Inventors: Ali A. Aliwi, Yarmouk (SA); Ridha A. Alhassan, Yarmouk (SA); Shadi M. Hazmi, Al-Ahsa-Salmaniyah (SA); Mohammad H. Abutalib, Abqaiq (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 336 days.

(21) Appl. No.: 17/930,594

(22) Filed: Sep. 8, 2022

(65) Prior Publication Data

US 2024/0084901 A1    Mar. 14, 2024

(51) Int. Cl.
*F16K 3/312*     (2006.01)
*E21B 4/00*      (2006.01)
*E21B 34/02*     (2006.01)

(52) U.S. Cl.
CPC .............. *F16K 3/312* (2013.01); *E21B 4/006* (2013.01); *E21B 34/02* (2013.01)

(58) Field of Classification Search
CPC ............ F16K 3/312; F16L 55/10; F16L 37/28
USPC ......................................... 138/94, 94.3, 94.5
See application file for complete search history.

(56) References Cited

U.S. PATENT DOCUMENTS

| | | | | |
|---|---|---|---|---|
| 1,727,644 A | * | 9/1929 | Holmquist | F16K 3/10 138/94.5 |
| 2,339,970 A | * | 1/1944 | Young | F16L 23/16 138/44 |
| 2,800,926 A | * | 7/1957 | Handley | F16K 3/312 138/44 |
| 2,861,599 A | * | 11/1958 | Hamer | F16K 3/12 138/94.5 |
| 4,343,332 A | * | 8/1982 | Williams, III | F16L 55/105 138/94.3 |
| 10,544,867 B2 | | 1/2020 | Alhabri et al. | |
| 11,346,465 B2 | | 5/2022 | Al-Otaibi et al. | |
| 2022/0107036 A1 | * | 4/2022 | Al-Otaibi | F16L 1/10 |

\* cited by examiner

*Primary Examiner* — Patrick F Brinson
(74) *Attorney, Agent, or Firm* — Vorys, Sater, Seymour and Pease LLP (57) ABSTRACT

A swinging device and related methods; the swinging device includes a first housing mountable to a first pipe on a first side of a pipe flange joint, a second housing mountable to a second pipe on a second side of a pipe flange joint, a shaft rotatably mounted to and extending between the first and second housings, and a spectacle blind mounted to the shaft such that rotating the shaft correspondingly rotates the spectacle blind between an open position, where the spectacle blind allows flow through the pipe flange joint, and a closed positon, where the spectacle blind prevents flow through the pipe flange joint.

20 Claims, 4 Drawing Sheets

SPECTACLE BLIND SWINGING DEVICES AND RELATED METHODS

FIELD OF THE DISCLOSURE

The present disclosure relates generally to spectacle blinds used in pipe flange joints and, more particularly, to devices for rotating a spectacle blind between opposing pipe flanges and between closed and open positions.

BACKGROUND OF THE DISCLOSURE

Spectacle blinds are widely-used safety devices that facilitate isolation of a portion of a pipe network or system by blocking flow at a pipe flange joint. Conventional spectacle blinds consist of two equally sized discs interconnected with a web of material. One of the discs is solid (e.g., non-perforated) and will fully block flow through the pipe flange joint when moved into position between opposing flanges. The second disc has a hole sized to the open diameter of the pipe, such that flow through the pipe is not obstructed when the second disc is positioned in the pipe flange joint.

For swift isolation or reintegration of a portion of the pipe network, the spectacle blind is rotated (swiveled) between the two positions such that the flow is altered in the desired manner without replacing the tooling. One advantage of spectacle blinds is the ease of visual confirmation of the pipe status (i.e., open or closed), as the disc not positioned within the flange joint visibly protrudes from the pipe.

Spectacle blinds can be used in a variety of piping sizes and pressure ratings, which might require larger and thicker discs to accommodate larger pipes. Industrial-grade spectacle blinds, for example, can weigh hundreds and even thousands of pounds. While light-weight spectacle blinds may be easily rotated around flange bolts, rotating or "swinging" industrial-grade blinds often requires the use of cranes, forklifts, and/or additional manpower. In these cases, the web is often mounted securely between the fasteners of the pipe flange joint and the spectacle blind is rotatable about a pivot point on the web.

Swinging an industrial-grade spectacle blind may be a costly operation that requires heavy equipment and additional safety measures. Accordingly, it is desirable to move large, heavy spectacle blinds between open and closed positions without the use of heavy equipment or additional laborers, resulting in less cost and labor.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to one or more aspects of the present disclosure, a swinging device is disclosed and includes a first housing mountable to a first pipe on a first side of a pipe flange joint, a second housing mountable to a second pipe on a second side of a pipe flange joint, a shaft rotatably mounted to and extending between the first and second housings, and a spectacle blind mounted to the shaft such that rotating the shaft correspondingly rotates the spectacle blind between an open position, where the spectacle blind allows flow through the pipe flange joint, and a closed positon, where the spectacle blind prevents flow through the pipe flange joint.

According to one or more additional aspects of the present disclosure, a method of operating a swinging device is disclosed and includes the steps of removing a plurality of fasteners that secure a first flange of a first pipe to a second flange of a second pipe at a pipe flange joint, wherein the swinging device includes a first housing mounted to the first pipe on a first side of the pipe flange joint, a second housing mounted to the second pipe on a second side of the pipe flange joint, a shaft rotatably mounted to and extending between the first and second housings, and a spectacle blind mounted to the shaft. The method further includes rotating the shaft and the spectacle blind to either an open position, where the spectacle blind allows flow through the pipe flange joint, or a closed positon, where the spectacle blind prevents flow through the pipe flange joint, and reinstalling the plurality of fasteners once the spectacle blind is moved to the open position or the closed position.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to spectacle blinds for use in pipe flange joints and, more particularly, to a device for rotating spectacle blinds in place between pipe flange joints.

Figure 1:
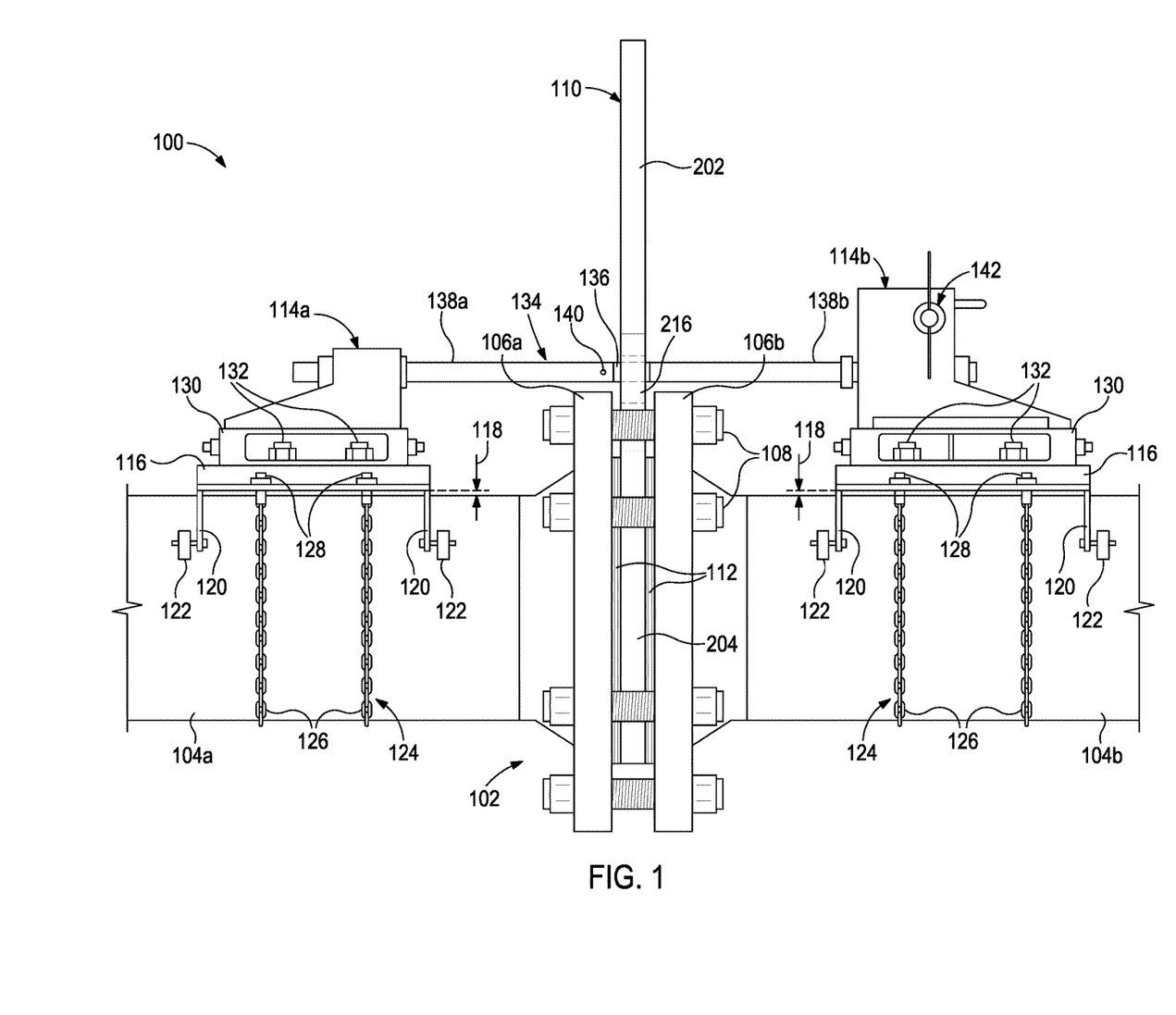
FIG. 1 is a schematic side view of an example swinging device in accordance with to one or more embodiments of the present disclosure.

FIG. 1 is a schematic side view of an example swinging device 100 in accordance with one or more embodiments of the present disclosure. The swinging device 100 may be mounted at a pipe flange joint 102 formed between opposing first and second pipes 104a and 104b. Each pipe 104a,b provides or otherwise defines a corresponding flange 106a and 106b, respectively, and the pipe flange joint 102 is formed by aligning and securing the flanges 106a,b together with a plurality of fasteners 108, such as stud bolts and nuts.

As described herein, the swinging device 100 may be operatively coupled to a spectacle blind 110 and configured to selectively rotate or "swing" the spectacle blind 110 between the opposing flanges 106a,b. More specifically, the swinging device 100 may be operable to rotate the spectacle blind 110 between a first or "open" position, where a portion of the spectacle blind 110 allows flow through the pipe flange joint 102, and a second or "closed" positon, where another portion of the spectacle blind 110 occludes the inner flow path of the pipes 104a,b and thereby obstructs (prevents) flow through the pipe flange joint 102.

Figure 2:
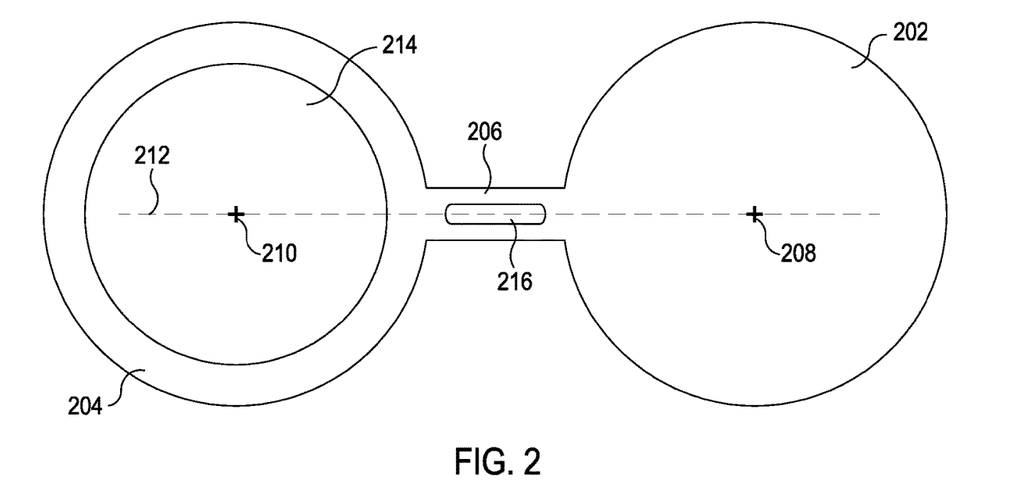
FIG. 2 is a schematic view of one example of the spectacle blind of FIG. 1, according to one or more embodiments.

Referring briefly to FIG. 2, illustrated is a schematic view of one example of the spectacle blind 110, according to one or more embodiments. As illustrated, the spectacle blind 110 includes or otherwise provides a first or "closed" disc 202 and a second or "open" disc 204 joined to one another by a web 206. The centers 208, 210 of each disc 202, 204, respectively, lie on a common line 212 that passes through the longitudinal axis of the web 206. The two discs 202, 204 joined by the web 206 give the appearance of a pair of spectacles; thus the name "spectacle blind."

The open disc 204 defines an aperture 214 sized to match the inside diameter of the pipes (e.g., the pipes 104a,b of FIG. 1) where the spectacle blind 110 is designed to be used. In some embodiments, the pipes 104a,b may exhibit standard diameters recommended by the American Society of Mechanical Engineers (ASME). When the spectacle blind 110 is moved to the open position, the open disc 204 is positioned in the pipe flange joint (e.g., the pipe flange joint 102 of FIG. 1) and the aperture 214 will allow flow through the pipe flange joint. In contrast, the closed disc 202 is solid and otherwise non-perforated, and large enough to fully block flow through the pipe flange joint. Consequently, when the spectacle blind 110 is moved to the closed position, the closed disc 204 is positioned in the pipe flange joint and will substantially occlude the flowpath and thereby provide an obstruction to fluid flow through the pipe flange joint.

In some embodiments, an elongate slot 216 may be defined in the web 106 and may extend parallel with and along the common line 212. The slot 216 may provide a location where the spectacle blind 110 may be operatively coupled to the swinging device 100 (FIG. 1), as will be described in more detail below. The slot 216 may prove advantageous in allowing the spectacle blind 110 to swing during operation, but also provide a small amount of lateral play (movement) to help properly position the spectacle blind 110 as needed.

Referring again to FIG. 1, the outer diameter of the closed and open discs 202, 204 may be slightly larger than a raised face 112 of the flanges 106a,b, and slightly less than the inner diameter of the bolting circle of the flanges 106a,b. The spectacle blind 110 is shown in FIG. 1 in the open position, where the open disc 204 is arranged between the flanges 106a,b and the closed disc 202 is oriented vertically above the open disc 204. In some embodiments, neither of the discs 202, 204 are drilled with holes that might align with the fasteners 108. Rather, the discs 202, 204 may be sized to fit inside the bolting circle of the mating flanges 106a,b. In other embodiments, however, one or both of the discs 202, 204 may define one or more holes that are alignable with the fasteners 108, without departing from the scope of the disclosure.

Upon removing the fasteners 108 from the flanges 106a,b, the swinging device 100 may be actuated and otherwise operated to rotate (swing) the spectacle blind 110 between the open and closed positions. Upon moving the spectacle blind 110 to the desired position (open or closed), the fasteners 108 may be re-installed on the flanges 106a,b and tightened. When the spectacle blind 110 is moved to the closed position, the closed disc 202 will be secured between the two flanges 106a,b and flow through the pipe flange joint 102 will be substantially blocked. In contrast, when the spectacle blind 110 is moved to the open position, the open disc 204 will be arranged between the two flanges 106a,b and thus enable flow through the pipe flange joint 102. Once the spectacle blind 110 is moved to either the open or closed positions, the plurality of fasteners 108 may then be reinstalled.

As illustrated, the swinging device 100 includes a first housing 114a and a second housing 114b installed on opposing sides of the pipe flange joint 102. More specifically, the first housing 114a may be operatively coupled to the first pipe 104a, and the second housing 114b may be operatively coupled to the second pipe 104b. Each housing 114a,b may be operatively coupled to a base plate 116 that can be removably attached to a corresponding pipe 104a,b. In some embodiments, the base plate 116 may be configured to rest directly on the outer surface of the corresponding pipe 104a,b. In other embodiments, however, one or both of the base plates 116 may be mounted such that a gap 118 is defined between the base plate 116 and the outer surface of the corresponding pipe 104a,b.

In some embodiments, one or both of the base plates 116 may provide at least one arcuate extension 120 and a wheel 122 may be rotatably coupled to the arcuate extension 120. The wheels 122 may be arranged to contact the outer surface of the corresponding pipe 104a,b and thereby offset the base plate 116 such that the gap 118 is defined between the base plate 116 and the outer surface of the pipes 104a,b. The wheels 122 may additionally allow for the rotation or angular alignment of the base plate 116 about the circumference of the corresponding pipe 104a,b. Accordingly, the wheels 122 may prove advantageous in helping to situate and adjust the base plate 116 about the pipe 104a,b.

Each base plate 116 may be removably coupled to the corresponding pipe 104a,b using a securing mechanism 124. The securing mechanism 124 may be adjustable and otherwise designed to secure the base plate 116 to a wide range of pipe sizes. Each securing mechanism 124 may include one or more adjustable members 126 coupled to the base plate 116 using one or more mechanical fasteners 128. Each adjustable member 126 is long enough to extend about the outer circumference of the corresponding pipe 104a,b.

Each adjustable member 126 is attached to the corresponding base plate 116 at two attachment points, as will be described in more detail below with reference to FIGS. 5A and 5B. The length of each adjustable member 126 may be adjusted (altered) to be able to extend about pipes of a variety of sizes. In the illustrated embodiment, for example, the adjustable members 126 are shown as chains exhibiting a length capable of extending about the outer circumference of a variety of pipe sizes, but also capable of being adjusted to accommodate pipes exhibiting a variety of diameters. More specifically, the chain may be attached to the corresponding base plate 116 at a first attachment point, as depicted in FIG. 1; then the chain may be wrapped around the corresponding pipe 104a,b and attached to the opposite side of the base plate 116 at a second attachment point using the appropriate link that reaches and otherwise coincides with the second attachment point. In other embodiments, the adjustable members 126 may comprise other types of adjustable attachment devices or means, without departing from the scope of the disclosure.

In some embodiments, one or both of the housings 114a,b may be directly coupled to the corresponding base plate 116. In other embodiments, however, an intermediate plate or structure 130 may interpose the housings 114a,b and the corresponding base plate 116. Accordingly, "operatively coupling" the housings 114a,b to the corresponding base plate 116 refers to any direct or indirect coupling or attachment. In embodiments that include the intermediate plate or structure 130, the intermediate plate or structure 130 may comprise an independent component part configured to interconnect or couple the housings 114a,b to the corresponding base plate 116. As illustrated, for example, the intermediate plate 130 may be removably coupled to the corresponding base plate 116 using one or more mechanical fasteners 132. In other embodiments, however, the intermediate plate or structure 130 may form an integral part of the housings 114a,b or the corresponding base plate 116.

The swinging device 100 may also include a shaft 134 that extends between the housings 114a,b and across the pipe flange joint 102 when the swinging device is properly assembled on the pipes 104a,b. As described in more detail below, opposing ends of the shaft 134 are rotatably mounted to the corresponding housing 114a,b, thus allowing the shaft 134 to rotate during operation of the swinging device 100. Moreover, the spectacle blind 110 is mounted to the shaft 134 at the elongate slot 216, such that rotating the shaft 134 correspondingly rotates the spectacle blind 110 in the same angular direction. In some embodiments, for example, the shaft 134 may define one or more planar surfaces 136 configured to mate with the slot 216. The planar surfaces 136 may comprise portions of the shaft 134 that are squared off or flat, and may be sized to engage opposing flat or planar surfaces defined by the elongate slot 216. Accordingly, in at least one embodiment, the slot 216 need not be "elongated," but could alternatively exhibit a generally square shape that mates with the planar surfaces 136 of the slot 216. The distribution of the weight of the spectacle blind 110 between the two housings 114a,b, each with a base plate 116 coupled to the corresponding pipe 104a,b, creates a robust system that allows for larger spectacle blinds to be rotated with increased safety and reliability.

In some embodiments, the shaft 134 may comprise a first shaft portion 138a operatively (pivotably) coupled to a second shaft portion 138b at a shaft pin 140. The first shaft portion 138a may be rotatably mounted to the first housing 114a and extend therefrom, and the second shaft portion 138b may be rotatably mounted to the second housing 114b and extend therefrom. The opposing ends of the shaft portions 138a,b meet at or near the center of the shaft 134.

Figure 3:
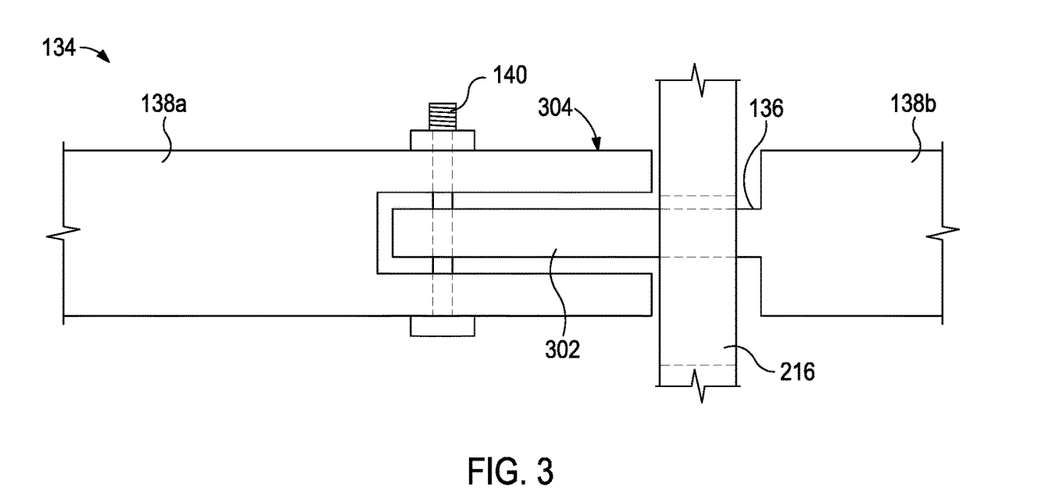
FIG. 3 is an enlarged view of an example interconnection between the first and second shaft portions of FIG. 1, according to one or more embodiments.

Referring briefly to FIG. 3, illustrated is an enlarged view of an example interconnection between the first and second shaft portions 138a,b, according to one or more embodiments. In the illustrated embodiment, the second shaft portion 138b provides or otherwise defines an axial extension 302 that extends through the slot 216. In at least one embodiment, the planar surfaces 136 of the shaft 134 may be defined on the axial extension 302 and may be configured to mate with opposing planar surfaces defined by the slot 216 such that rotating the shaft 134 will correspondingly rotate the spectacle blind 110 in the same angular direction. Because the geometry of the slot 216 is configured and sized to mate with the planar surfaces 136 of the shaft 134, rounded sections of the shaft 134 are unable to pass through the slot 216. Accordingly, the two-part shaft 134 may prove advantageous in providing a location where the planar surfaces 136 can be defined, while simultaneously allowing the shaft 134 to extend through the slot 216.

The first shaft portion 138a may provide or define a slotted or "forked" end 304 sized to receive the axial extension 302 of the second shaft portion 138b. The shaft pin 140 may extend through aligned portions of the axial extension 302 and the slotted end 304 to couple the first and second shaft portions 138a,b together. The shaft pin 140 may thus strengthen the connection between the first and second shaft portions 138a,b and thereby secure the spectacle blind 110. The shaft pin 140 is shown as a threaded fastener, but may alternatively comprise other means of pivotably coupling the axial extension 302 to the slotted end 304. Additionally, those skilled in the art will readily appreciate that while FIG. 3 depicts the axial extension 302 connecting the first shaft portion 138a to the slotted end 304 of the second shaft portion 138b, other designs or configurations may alternatively be used, without departing from the scope of the disclosure.

Referring again to FIG. 1, the second housing 114b may operate (serve) as a gearbox that houses gearing or a gear train (not visible) configured to rotate the shaft 134 and thereby rotate the spectacle blind 110. In some embodiments, the gear train may be operated via an electromechanical device, such as through operation of a motor or one or more servos arranged to drive the gear train. In other embodiments, however, the gear train may be manually operated. In such embodiments, the swinging device 100 may further include a manual drive handle 142 rotatably mounted to the second housing 114b. A user (operator) may be able to manually grasp and rotate the manual drive handle 142, and thereby cause the gear train housed within the second housing 114b to drive rotation of the shaft 134 and thereby rotate the spectacle blind 110 between the open and closed positions.

Figure 4:
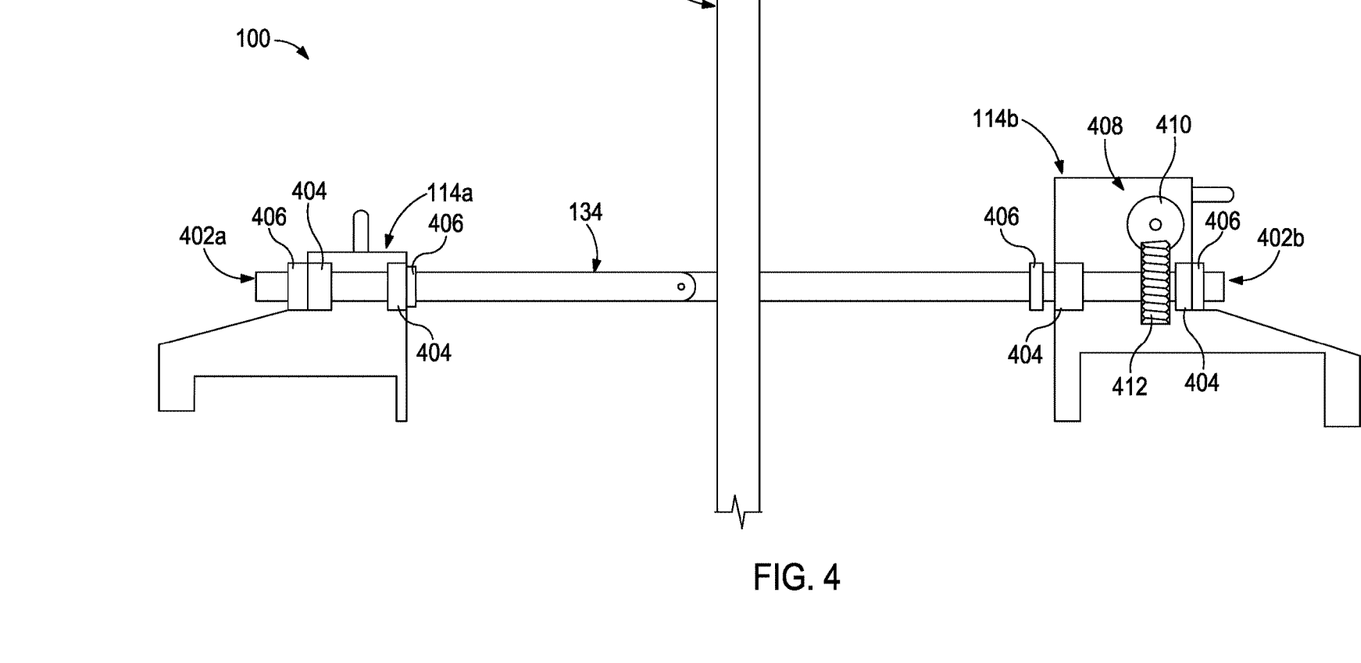
FIG. 4 is an enlarged schematic view of the swinging device of FIG. 1, according to one or more embodiments.

FIG. 4 is an enlarged schematic view of the swinging device 100, according to one or more embodiments. In FIG. 4, the side wall of the housings 114a,b is omitted to enable viewing of the internal features. As illustrated, the shaft 134 extends between the first and second housings 114a,b and its opposing ends are rotatably mounted to the corresponding housing 114a,b. More specifically, the shaft 134 has a first end 402a rotatably mounted to the first housing 114a, and a second end 402b rotatably mounted to the second housing 114b. In at least one embodiment, as illustrated, the shaft 134 extends entirely through both housings 114a,b such that the first end 402a extends past (out of) the first housing 114a and the second end 402b extends past (out of) the second housing 114b. In other embodiments, however, the ends 402a,b need not extend through the housings 114a,b to be supported thereby.

One or more support bearings 404 may rotatably support the shaft 134 at each housing 114a,b. In the illustrated embodiment, for example, the ends 402a,b of the shaft 134 may be supported at each housing 114a,b with two support bearings 404, a first support bearing 404 arranged at a front wall of the housing 114a,b, and a second support bearing 404 arranged at a back wall of the housing 114a,b. In at least one embodiment, each support bearing 404 may be arranged within the corresponding housing 114,b, but could alternatively be arranged outside of the housings 114a,b, without departing from the scope of the disclosure. Moreover, while two support bearings 404 are depicted at each end of the shaft 134, more or less than two support bearings 404 may be used, without departing from the scope of the disclosure.

The swinging device 100 may further include one or more stop washers 406 arranged on the shaft 134 and configured to help prevent axial movement of the shaft 134 during operation. In the illustrated embodiment, for example, a pair of stop washers 406 may be arranged at or near each end 402a,b of the shaft 134, a first stop washer 406 being arranged at a front wall of the housing 114a,b, and a second stop washer 406 being arranged at a back wall of the housing 114a,b. In at least one embodiment, each stop washer 406 may be arranged outside of the corresponding housing 114,b, as illustrated, but could alternatively be arranged inside the housings 114a,b, without departing from the scope of the disclosure. Moreover, while two stop washers 406 are depicted at or near each end of the shaft 134, more or less than two stop washers 406 may be used, without departing from the scope of the disclosure. In the illustrated embodiment, both housings 114a,b include two support bearings 404 and two stop washers 406 each, which creates a robust rotatable attachment to each housing 114a,b.

As mentioned above, the second housing 114b may operate as a gear box that houses gearing (such as gear train 408) configured to drive (rotate) the shaft 134 and thereby rotate the spectacle blind 110. The gear train 408 may include a plurality of intermeshed gears. In the illustrated embodiment, for example, the gear train 408 may include a drive gear 410 rotatably mounted within the second housing 114b and arranged to intermesh with a driven gear 412 coupled to the shaft 134. Rotating the drive gear 410 will urge the driven gear 412 to rotate, which causes the shaft 134 and the interconnected spectacle blind 110 to rotate. In at least one embodiment, as illustrated, the drive gear 410 may comprise a worm gear, and the driven gear 412 may comprise a worm wheel arranged to intermesh with the worm gear. Those skilled in the art, however, will readily appreciate that the drive and driven gears 410, 412 may comprise other types of gears or gearing capable of driving the shaft 134 in rotation. Moreover, while only two gears 410, 412 are shown in the gear train 408, more than two intermeshed gears may be included within the gear train 408, without departing from the scope of the disclosure.

Figure 4A:
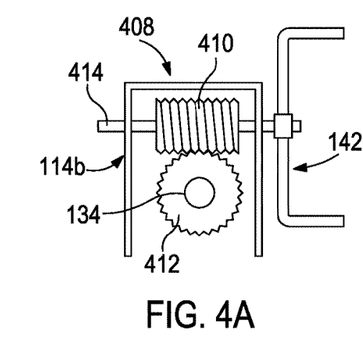
FIG. 4A is an alternative view of the gear train of FIG. 4.

FIG. 4A is an alternative view of the gear train 408 of FIG. 4. More specifically, FIG. 4A shows the gear train 408 offset 90° from the vantage shown in FIG. 4. As illustrated, the drive gear 410 may be mounted to a drive shaft 414 that rotatably mounts the drive gear 410 within the second housing 114b. Moreover, the drive gear 410 is arranged to intermesh with the driven gear 412, which is mounted to the shaft 134, such that rotating the drive gear 410 will correspondingly cause the shaft 134 to rotate.

In some embodiments, as illustrated, the manual drive handle 142 may be operatively coupled to the drive shaft 414 such that manually rotating the drive handle 142 will correspondingly rotate the drive shaft 414 and thereby cause the drive gear 410 to rotate. It should be noted that the manual drive handle 142 may take on many forms and is not limited to the example shown in FIG. 4A.

Figure 5A:
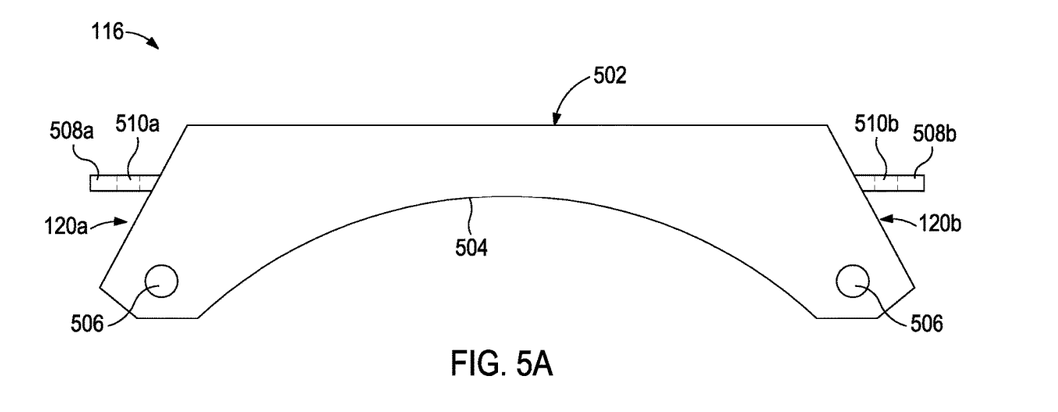
FIG. 5A is an end view of an example base plate, according to one or more embodiments.
Figure 5B:
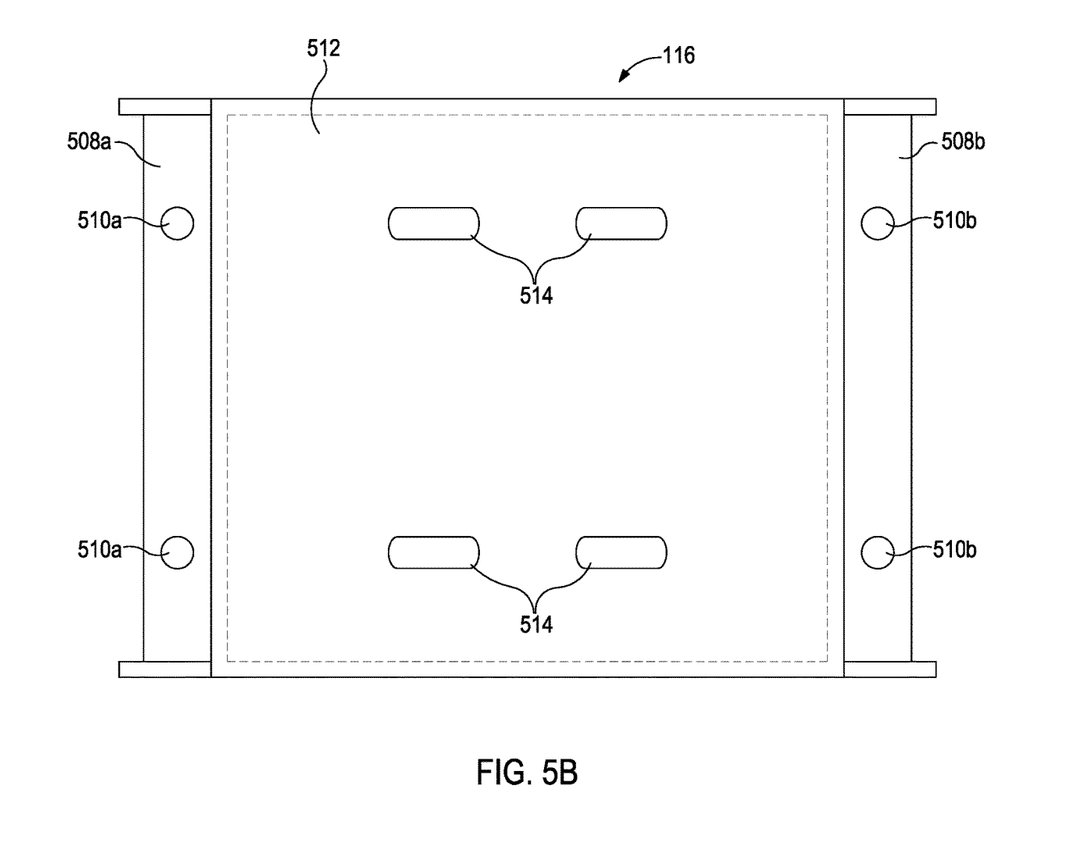
FIG. 5B is a top view of the base plate of FIG. 5A, according to one or more embodiments.

FIG. 5A is an end view of an example base plate 116 of FIG. 1, and FIG. 5B is a top view of the base plate 116, according to one or more embodiments. In FIG. 5A, the base plate 116 has a body 502 that defines a generally curved or arcuate lower surface 504, which can approximate the curved geometry of the outer circumference of a pipe (e.g., the pipes 104a,b of FIG. 1). In some embodiments, as mentioned above, the arcuate surface 504 may rest on the outer circumference (surface) of the corresponding pipe or may otherwise be offset therefrom.

In the illustrated embodiment, the body 502 and the arcuate lower surface 504 cooperatively define or provide opposing arcuate extensions 120, shown as arcuate extensions 120a and 120b at opposing ends of the body 502. In some embodiments, each arcuate extension 120a,b defines an aperture 506 where a corresponding one of the wheels 122 (FIG. 1) can be rotatably mounted.

In some embodiments, the base plate 116 may further include or otherwise provide one or more attachment plates where the adjustable members 126 (FIG. 1) can be coupled to the base plate 116. In the illustrated embodiment, the base plate 116 includes two attachment plates, shown as a first attachment plate 508a and a second attachment plate 508b. In some embodiments, however, the first and second attachment plates 508a,b may comprise opposing ends of the same attachment plate.

As mentioned above, each adjustable member 126 may be long enough to extend about the outer circumference of the corresponding pipe, and each adjustable member 126 may be attached to the base plate 116 at two attachment points, shown in FIG. 5A as a first attachment point 510a provided on the first attachment plate 508a, and a second attachment point 510b provided on the second attachment plate 508b. In the illustrated embodiment, the attachment points 510a,b are depicted as apertures or holes defined in the corresponding attachment plates 508a,b. One end of the adjustable member 126 can be coupled to the base plate 116 at the first attachment point 510a, extend around the underlying pipe, and may be coupled to the base plate 116 at the second attachment point 510b. Thus, the base plate 116 may be able to be attached to a wide variety of pipe sizes.

In FIG. 5B, each attachment plate 508a,b can include multiple attachment points 510a,b. More specifically, the first attachment plate 508a includes two first attachment points 510a, and the second attachment plate 508b includes two second attachment points 510b. Moreover, while two attachment points 510a,b are depicted on each attachment plate 508a,b, more or less than two attachment points 510a,b may be used without departing from the scope of the disclosure.

The base plate 116 also provides or defines a mounting plate 512. One or more mounting apertures 514 (four shown) may be defined in the mounting plate 512. The mounting apertures 514 may be used to receive mechanical fasteners (e.g., the mechanical fasteners 132 of FIG. 1) that couple the base plate 116 to the intermediate plate or structure 130, or alternatively directly to a corresponding one of the housings 114a,b (FIGS. 1 and 4). While four mounting apertures 514 are depicted on the mounting plate 512, more or less than four mounting apertures 514 may be provided without departing from the scope of the disclosure.

The principles disclosed herein may also prove advantageous in eliminating the need for a hot work permit in the plant where the spectacle blind 110 is to be used. Because the spectacle blind 110 is designed to be operated without the need of diesel operated equipment or spark-generating activities, a hot work permit is not required even during maintenance activities.

Embodiments disclosed herein include:

A. A swinging device that includes a first housing mountable to a first pipe on a first side of a pipe flange joint, a second housing mountable to a second pipe on a second side of a pipe flange joint, a shaft rotatably mounted to and extending between the first and second housings, and a spectacle blind mounted to the shaft such that rotating the shaft correspondingly rotates the spectacle blind between an open position, where the spectacle blind allows flow through the pipe flange joint, and a closed positon, where the spectacle blind prevents flow through the pipe flange joint.

B. A method of operating a swinging device includes removing a plurality of fasteners that secure a first flange of a first pipe to a second flange of a second pipe at a pipe flange joint, wherein the swinging device includes a first housing mounted to the first pipe on a first side of the pipe flange joint, a second housing mounted to the second pipe on a second side of the pipe flange joint, a shaft rotatably mounted to and extending between the first and second housings, and a spectacle blind mounted to the shaft. The method further includes rotating the shaft and the spectacle blind to either an open position, where the spectacle blind allows flow through the pipe flange joint, or a closed positon, where the spectacle blind prevents flow through the pipe flange joint, and reinstalling the plurality of fasteners once the spectacle blind is moved to the open position or the closed position.

Each of embodiments A and B may have one or more of the following additional elements in any combination: Element 1: further comprising a gear train housed within the second housing and operatively coupled to the shaft such that driving the gear train correspondingly rotates the shaft and moves the spectacle blind between the open and closed positions. Element 2: further comprising a manual drive handle rotatably mounted to the second housing and operatively coupled to the gear train such that manually rotating the manual drive handle drives the gear train and correspondingly rotates the shaft and the spectacle blind. Element 3: wherein the spectacle blind comprises a closed disc, an open disc that defines an aperture, and a web that interconnects the closed and open discs and defines a slot that receives the shaft, wherein rotating the spectacle blind to the open position places the open disc in the pipe flange joint, and rotating the spectacle blind to the closed position places the closed disc in the pipe flange joint. Element 4: further comprising a first base plate removably attachable to the first pipe, the first housing being configured to be operatively coupled to the first base plate, and a second base plate removably attachable to the second pipe, the second housing being configured to be operatively coupled to the second base plate. Element 5: wherein each base plate comprises a body that defines an arcuate lower surface, and opposing arcuate extensions cooperatively defined by the body and the arcuate lower surface. Element 6: further comprising a wheel rotatably coupled to each arcuate extension and configured to contact an outer surface of the first pipe or the second pipe and thereby offset the base plate from the outer surface of the first pipe or the second pipe. Element 7: further comprising one or more first adjustable members that removably attach the first base plate to the first pipe, and one or more second adjustable members that removably attach the second base plate to the second pipe, wherein a length of each adjustable member is adjustable to be able to extend about a variety of pipe sizes. Element 8: further comprising a first intermediate structure interposing the first housing and the first base plate, and a second intermediate structure interposing the second housing and the second base plate. Element 9: wherein the shaft comprises a first shaft portion rotatably mounted to the first housing, and a second shaft portion rotatably mounted to the second housing and operatively coupled to the first shaft portion.

Element 10: wherein the swinging device further includes a gear train housed within the second housing and operatively coupled to the shaft, and wherein rotating the shaft and the spectacle blind comprises driving the gear train to thereby rotate the shaft and the spectacle blind. Element 11: wherein the swinging device further includes a manual drive handle rotatably mounted to the second housing and operatively coupled to the gear train, and wherein driving the gear train comprises manually rotating the manual drive handle and thereby causing the gear train to drive against the shaft and rotate the spectacle blind. Element 12: wherein the spectacle blind includes a closed disc, an open disc that defines an aperture, and a web that interconnects the closed and open discs and defines a slot that receives the shaft, the method further comprising rotating the spectacle blind to the open position by positioning the open disc in the pipe flange joint, and rotating the spectacle blind to the closed position by positioning the closed disc in the pipe flange joint. Element 13: wherein the swinging device further includes a first base plate removably attached to the first pipe, the first housing being operatively coupled to the first base plate, and a second base plate removably attached to the second pipe, the second housing being operatively coupled to the second base plate.

By way of non-limiting example, exemplary combinations applicable to A and B include: Element 1 with Element 2; Element 4 with Element 5; Element 5 with Element 6; Element 4 with Element 7; Element 4 with Element 8; and Element 10 with Element 11.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, if used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, as used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The invention claimed is:

1. A swinging device, comprising:
   a first housing mountable to a first pipe on a first side of a pipe flange joint;
   a second housing mountable to a second pipe on a second side of a pipe flange joint;
   a shaft rotatably mounted to and extending between the first and second housings;
   a gear train operatively coupled to the shaft such that driving the gear train correspondingly rotates the shaft; and
   a spectacle blind mounted to the shaft such that rotating the shaft correspondingly rotates the spectacle blind between an open position, whereby the spectacle blind allows flow through the pipe flange joint, and a closed position positon, whereby the spectacle blind prevents flow through the pipe flange joint.

2. The swinging device of claim 1, wherein the gear train is housed within the second housing and includes a drive gear rotatably mounted within the second housing and a driven gear operatively coupled to the shaft.

3. The swinging device of claim 2, further comprising a manual drive handle rotatably mounted to the second housing and operatively coupled to the gear train such that manually rotating the manual drive handle drives the gear train and correspondingly rotates the shaft and the spectacle blind.

4. The swinging device of claim 1, wherein the spectacle blind comprises:
   a closed disc;
   an open disc that defines an aperture; and
   a web that interconnects the closed and open discs and defines a slot that receives the shaft,
   wherein rotating the spectacle blind to the open position places the open disc in the pipe flange joint, and rotating the spectacle blind to the closed position places the closed disc in the pipe flange joint.

5. The swinging device of claim 1, further comprising:
   a first base plate removably attachable to the first pipe, the first housing being configured to be operatively coupled to the first base plate; and
   a second base plate removably attachable to the second pipe, the second housing being configured to be operatively coupled to the second base plate.

6. The swinging device of claim 5, wherein each base plate comprises:
   a body that defines an arcuate lower surface; and
   opposing arcuate extensions cooperatively defined by the body and the arcuate lower surface.

7. The swinging device of claim 6, further comprising a wheel rotatably coupled to each arcuate extension and configured to contact an outer surface of the first pipe or the second pipe and thereby offset the base plate from the outer surface of the first pipe or the second pipe.

8. The swinging device of claim 5, further comprising:
   one or more first adjustable members that removably attach the first base plate to the first pipe; and
   one or more second adjustable members that removably attach the second base plate to the second pipe,
   wherein a length of each adjustable member is adjustable to be able to extend about a variety of pipe sizes.

9. The swinging device of claim 5, further comprising:
   a first intermediate structure interposing the first housing and the first base plate; and
   a second intermediate structure interposing the second housing and the second base plate.

10. The swinging device of claim 1, wherein the shaft comprises:
    a first shaft portion rotatably mounted to the first housing; and
    a second shaft portion rotatably mounted to the second housing and operatively coupled to the first shaft portion.

11. A method of operating a swinging device, comprising:
    removing a plurality of fasteners that secure a first flange of a first pipe to a second flange of a second pipe at a pipe flange joint, wherein the swinging device includes:
      a first housing mounted to the first pipe on a first side of the pipe flange joint;
      a second housing mounted to the second pipe on a second side of the pipe flange joint;
      a shaft rotatably mounted to and extending between the first and second housings;
      a gear train operatively coupled to the shaft such that driving the gear train correspondingly rotates the shaft; and
      a spectacle blind mounted to the shaft;
    driving the gear train to thereby rotate the shaft and the spectacle blind to either an open position, where the spectacle blind allows flow through the pipe flange joint, or a closed position positon, where the spectacle blind prevents flow through the pipe flange joint; and
    reinstalling the plurality of fasteners once the spectacle blind is moved to the open position or the closed position.

12. The method of claim 11, wherein the gear train is housed within the second housing and includes a drive gear rotatably mounted within the second housing and a driven gear operatively coupled to the shaft, and wherein driving the gear train comprises driving the drive gear to correspondingly rotate the driven gear and the shaft.

13. The method of claim 12, wherein the swinging device further includes a manual drive handle rotatably mounted to the second housing and operatively coupled to the gear train, and wherein driving the gear train comprises manually rotating the manual drive handle and thereby causing the gear train to drive against the shaft and rotate the spectacle blind.

14. The method of claim 11, wherein the spectacle blind includes a closed disc, an open disc that defines an aperture, and a web that interconnects the closed and open discs and defines a slot that receives the shaft, the method further comprising:
    rotating the spectacle blind to the open position by positioning the open disc in the pipe flange joint; and
    rotating the spectacle blind to the closed position by positioning the closed disc in the pipe flange joint.

15. The method of claim 11, wherein the swinging device further includes:
    a first base plate removably attached to the first pipe, the first housing being operatively coupled to the first base plate; and
    a second base plate removably attached to the second pipe, the second housing being operatively coupled to the second base plate.

16. The method of claim 15, further comprising adjusting the first and second base plates about the first and second pipe, respectively, via one or more wheels rotatably coupled to each base plate.

17. The swinging device of claim 3, further comprising a drive shaft interposing and operatively coupled to the manual drive handle and the drive gear.

18. The swinging device of claim 10, wherein the first shaft portion defines a slotted end extending from the first housing, wherein the second shaft portion defines an axial extension extending from the second housing, and wherein the axial extension and slotted end are coupled via a shaft pin to form the shaft.

19. The method of claim 11, further comprising mating a first shaft portion extending from the first housing to a second shaft portion extending from the second housing to form the shaft, wherein the first shaft portion defines a slotted end and the second shaft portion defines an axial extension.

20. The method of claim 19, wherein mating the first shaft portion to the second shaft portion includes inserting the axial extension into the slotted end and inserting a shaft pin to form the shaft.

\* \* \* \* \*